(12) United States Patent  
Yoshimi

(10) Patent No.: US 10,815,868 B2  
(45) Date of Patent: Oct. 27, 2020

(54) COOLING CONTROL DEVICE

(71) Applicant: SUBARU CORPORATION, Tokyo (JP)

(72) Inventor: Shogo Yoshimi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 88 days.

(21) Appl. No.: 15/979,758

(22) Filed: May 15, 2018

(65) Prior Publication Data

US 2019/0048783 A1  Feb. 14, 2019

(30) Foreign Application Priority Data

Aug. 9, 2017  (JP) .................. 2017-154291

(51) Int. Cl.
*F01P 7/16* (2006.01)
*F01P 3/20* (2006.01)
*F16K 31/04* (2006.01)
*F01P 7/14* (2006.01)

(52) U.S. Cl.
CPC ...... *F01P 7/16* (2013.01); *F01P 3/20* (2013.01); *F01P 7/167* (2013.01); *F16K 31/04* (2013.01); *F01P 2007/146* (2013.01); *F01P 2023/00* (2013.01); *F01P 2025/08* (2013.01)

(58) Field of Classification Search
CPC ............. F01P 2007/146; F01P 2023/00; F01P 2025/08; F01P 3/20; F01P 7/16; F01P 7/167; F16K 11/0856; F16K 31/04
See application file for complete search history.

(56) References Cited

U.S. PATENT DOCUMENTS

2006/0076840 A1* 4/2006 Yamaguchi ............. B60L 1/003  
                                                    310/53  
2008/0066700 A1* 3/2008 Mashiki .................. F01L 1/022  
                                                    123/90.11

(Continued)

FOREIGN PATENT DOCUMENTS

JP         10280955 A  * 10/1998  
JP     2006-038182 A     2/2006

(Continued)

OTHER PUBLICATIONS

Machine Translation of JP-10280955-A PDF File Name: "JPH10280955A_Machine_Translation.pdf".*

(Continued)

*Primary Examiner* — Lindsay M Low  
*Assistant Examiner* — Ruben Picon-Feliciano  
(74) *Attorney, Agent, or Firm* — Troutman Pepper Hamilton Sanders LLP

(57) ABSTRACT

A cooling control device includes a switching valve, an electric motor, and a controller. The switching valve has a coolant outlet. The coolant outlet is configured such that a coolant flows through the coolant outlet. The electric motor is configured to operate the switching valve to switch connecting and shutting off between the coolant outlet and a coolant transporting unit. The controller is configured to determine a duty ratio of a signal for controlling the electric motor on a basis of the temperature of the coolant over a predetermined period of time after the electric motor starts operating the switching valve.

9 Claims, 7 Drawing Sheets

(56) References Cited

U.S. PATENT DOCUMENTS

| | | | |
|---|---|---|---|
| 2009/0139686 A1* | 6/2009 | Suzuki | B60K 6/445 |
| | | | 165/42 |
| 2009/0164098 A1* | 6/2009 | Uda | F02D 9/1065 |
| | | | 701/103 |
| 2013/0047941 A1* | 2/2013 | Niwa | F02D 9/1065 |
| | | | 123/90.11 |
| 2014/0062228 A1* | 3/2014 | Carpenter | H02K 9/24 |
| | | | 310/53 |
| 2017/0292435 A1 | 10/2017 | Toyama et al. | |
| 2018/0112592 A1* | 4/2018 | Hojo | F02B 39/16 |
| 2018/0163615 A1* | 6/2018 | Kurauchi | F02D 41/0007 |
| 2018/0230891 A1* | 8/2018 | Sato | F01P 7/14 |
| 2018/0252146 A1* | 9/2018 | Nagai | F01P 3/02 |
| 2020/0080446 A1* | 3/2020 | Cocuzza | F01K 9/003 |

FOREIGN PATENT DOCUMENTS

| | | | |
|---|---|---|---|
| JP | 2007-154854 A | | 6/2007 |
| JP | 2012-177874 A | | 9/2012 |
| KR | 20190014208 A | * | 2/2019 |
| WO | 2016/076324 A1 | | 5/2016 |

OTHER PUBLICATIONS

Machine Translation of KR-20190014208-A PDF file name: "KR20190014208A_Machine_Translation.pdf".*
Japanese Office Action issued for corresponding Application No. 2017-154291 dated Jan. 29, 2019.

* cited by examiner

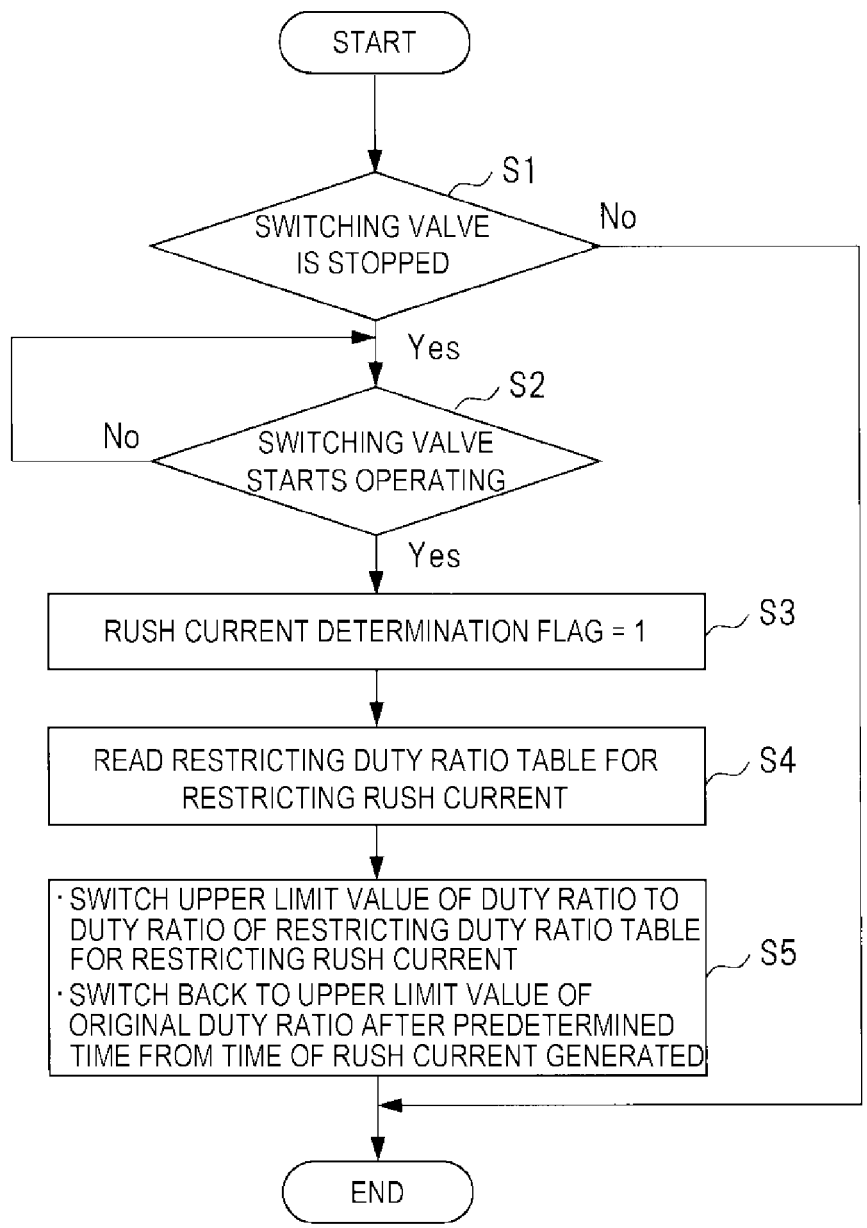

COOLING CONTROL DEVICE

CROSS-REFERENCE TO RELATED APPLICATIONS

The present application claims priority from Japanese Patent Application Publication No. 2017-154291 filed on Aug. 9, 2017, the entire contents of which are hereby incorporated by reference.

FILED OF TECHNOLOGY

The present invention relates to a cooling control device comprising a switching valve provided in a passage for transporting coolant and an electric motor for operating the switching valve.

BACKGROUND

A motor drive device for controlling an electric motor is described in Japanese Patent No. 5780385. The motor drive device described in Japanese Patent No. 5780385 is used in an image forming device. The motor drive device comprises a controller, an image forming unit, a feeder, a processor, a power supply, a temperature sensor, a main motor for driving the image forming unit, and a sub-motor for driving the feeder. The power supply incorporates a current detector for detecting power supply current supplied to the controller.

SUMMARY

An aspect of the present invention provides a cooling control device, including a switching valve having a coolant outlet, an electric motor, and a controller. The switching valve has a coolant outlet configured such that a coolant flows through the coolant outlet. The electric motor is configured to operate the switching valve to switch connecting and shutting off between the coolant outlet and a coolant transporting unit. The controller is configured to determine a duty ratio of a signal for controlling the electric motor on a basis of the temperature of the coolant over a predetermined period of time after the electric motor starts operating the switching valve.

An aspect of the present invention provides a cooling control device, including a switching valve having a coolant outlet, an electric motor, and circuitry. The switching valve has a coolant outlet configured such that a coolant flows through the coolant outlet. The electric motor is configured to operate the switching valve to switch connecting and shutting off between the coolant outlet and a coolant transporting unit. The circuitry is configured to determine a duty ratio of a signal for controlling the electric motor on a basis of the temperature of the coolant over a predetermined period of time after the electric motor starts operating the switching valve.

BRIEF DESCRIPTION OF THE DRAWINGS

FIG. 8 is a flowchart illustrating an example of a control operation of the switching valve.

DETAILED DESCRIPTION

Figure 1:
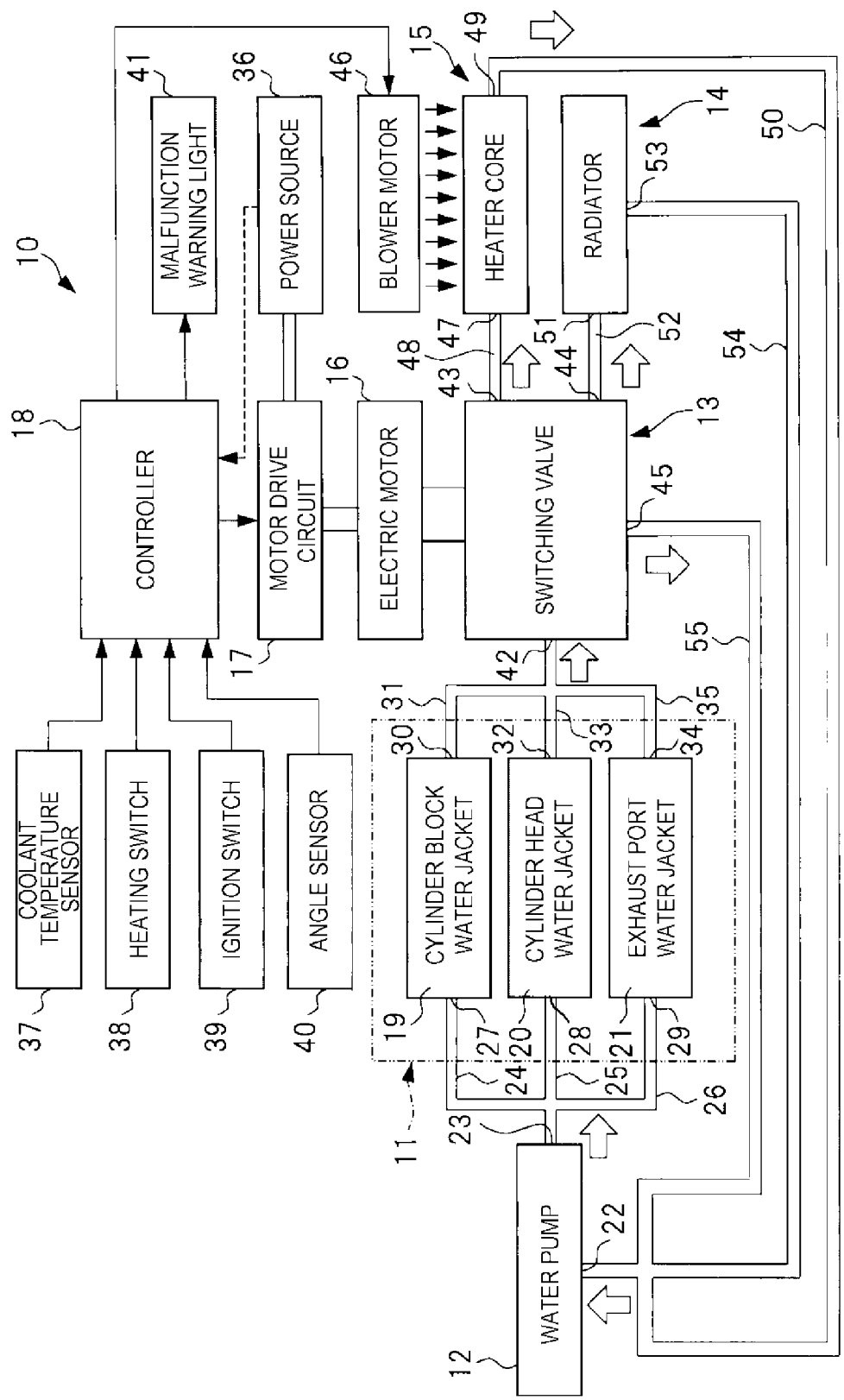
FIG. 1 is a schematic diagram illustrating a vehicle having a cooling control device.

Hereinafter, an example in which a cooling control device of the present invention is provided in a vehicle will be described with reference to the drawings. Note that sizes, materials, specific values, and any other factors illustrated in the example are illustrative for easier understanding of the present invention, and are not intended to limit the scope of the present invention unless otherwise specifically stated. Further, elements in the example which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the present invention are unillustrated in the drawings.

The controller described in Japanese Patent No. 5780385 sets a duty ratio of a PWM signal so as to limit the detection result of a current detector to a rated current or lower as long as the detection result of a temperature sensor is less than a predetermined temperature when a main motor and a sub-motor are started. Further, when the main motor and the sub-motor are started, the controller sets the duty ratio of the PWM signal to 100% as long as the detection result of the temperature sensor is equal to or higher than a predetermined temperature.

The motor drive device may have a problem in that the number of components increases because a current detector is provided for the purpose of controlling the motor.

It is desirable to provide a cooling control device that suppresses the increase in the number of components for controlling the electric motor.

FIG. 1 is a schematic diagram illustrating a vehicle having a cooling control device according to the example. The vehicle 10, illustrated in FIG. 1, includes an engine 11, a water pump 12, a switching valve 13, a radiator 14, a heater core 15, an electric motor 16, a motor drive circuit 17, and a controller 18.

The engine 11 is a power source that generates torque to be transmitted to drive wheels of the vehicle 10, and the engine 11 may be any one of a gasoline engine, a diesel engine, or a liquefied propane gas engine. The engine 11 combusts fuel in a combustion chamber, and converts thermal energy at the time of combustion of the fuel into kinetic energy of a crankshaft. The engine 11 has a cylinder block water jacket 19, a cylinder head water jacket 20, and an exhaust port water jacket 21. The cylinder block water jacket 19 is provided in a cylinder block of the engine 11, and the cylinder head water jacket 20 is provided in a cylinder head of the engine 11.

An exhaust pipe is provided to which flow from the combustion chamber is connected and a cylinder portion that supports the exhaust pipe is provided in the cylinder head. The exhaust port water jacket 21 is provided in the cylinder portion. The cylinder block water jacket 19, the cylinder head water jacket 20, and the exhaust port water jacket 21 are passages for coolant.

The water pump 12 has a suction port 22 and a discharge port 23, and is driven by a rotational force transmitted from the crankshaft to draw in and discharge the coolant. The discharge port 23 splits and connects to three cooling passages 24, 25, 26. The cooling passage 24 connects to an inlet 27 of the cylinder block water jacket 19. The cooling passage 25 connects to an inlet 28 of the cylinder head water jacket 20. The cooling passage 26 connects to an inlet 29 of the exhaust port water jacket 21.

An outlet 30 of the cylinder block water jacket 19 connects to a cooling passage 31. An outlet 32 of the cylinder head water jacket 20 connects to a cooling passage 33. An outlet 34 of the exhaust port water jacket 21 is connected to a cooling passage 35.

Figure 3:
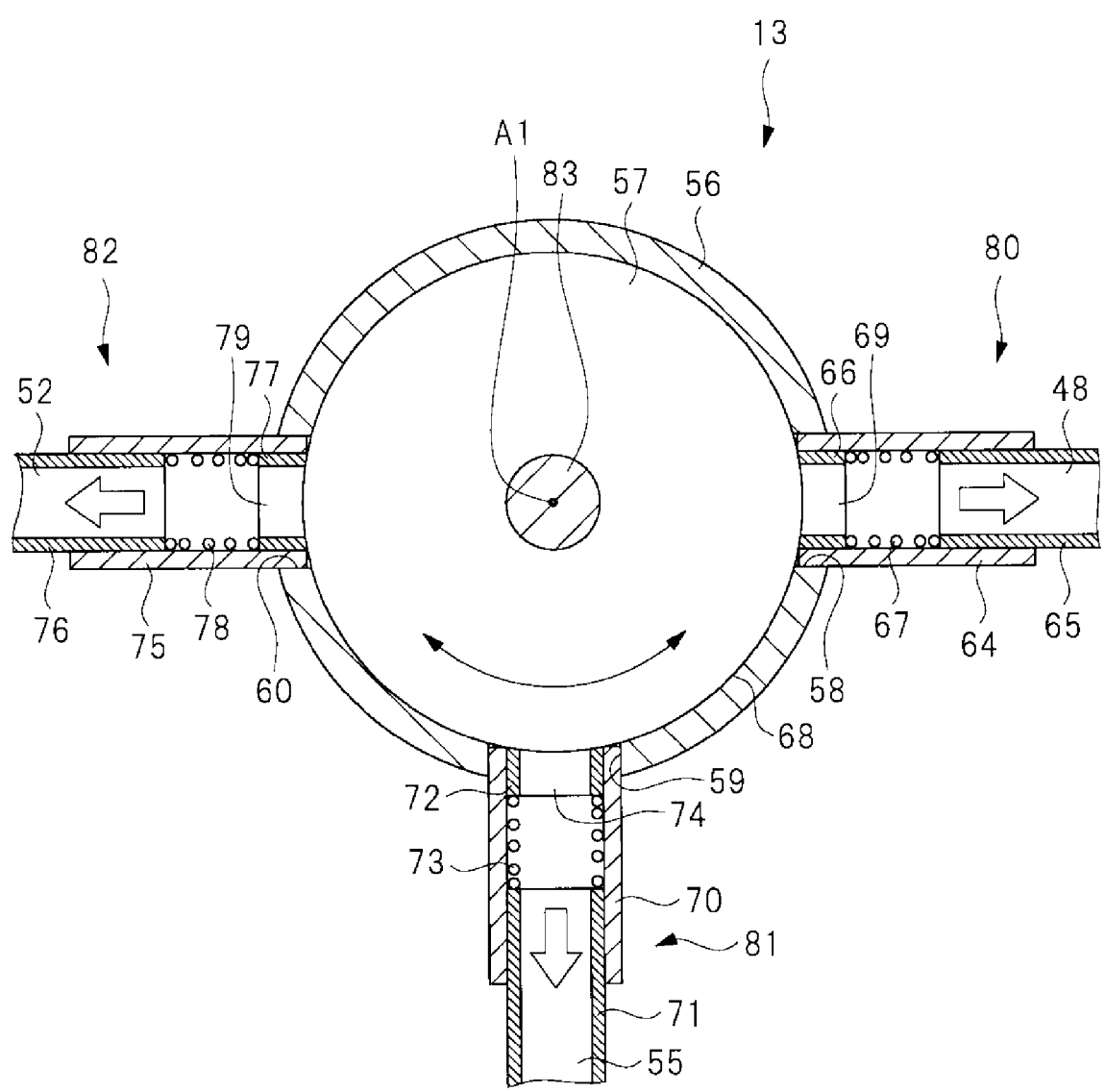
FIG. 3 is a horizontal cross-sectional view illustrating the switching valve.

The electric motor 16 can rotate a rotating shaft 83, illustrated in FIG. 3, by applying current to the electric motor 16. The electric motor 16 can, for instance, use a three-phase AC type stepping motor. The electric motor 16 has a stator and a rotor, and the stator has windings for carrying current. The rotor is attached to the rotating shaft 83. The vehicle 10 has a power source 36. The power source 36 is a rechargeable battery that can be charged and discharged. The motor drive circuit 17 electrically connects and cuts off the power supply 36 and the electric motor 16. The motor drive circuit 17 is composed of an inverter having a plurality of switching elements. The switching elements are semiconductor devices.

The controller 18 is activated by current applied from the power source 36 and outputs a signal for controlling the motor drive circuit 17. The controller 18 is a commonly known electronic control device having an input port, an output port, a memory unit, a processor, and a timer. By controlling a duty ratio of signal input from the controller 18 to the motor drive circuit 17, the voltage and current applied to the windings of the electric motor 16 are controlled. By controlling the ratio between on and off, namely, the duty ratio, of the switching element of the motor drive circuit 17, the rotation speed and torque of the electric motor 16 per unit of time can be controlled. Further, the controller 18 controls the motor drive circuit 17 to switch the direction of current flowing through the windings of the electric motor 16 and the rotational direction of the rotating shaft 83 of the electric motor 16.

Signals from a coolant temperature sensor 37, a heater switch 38, an ignition switch 39, and an angle sensor 40 are input to the controller 18. The coolant temperature sensor 37 detects the temperature of coolant supplied to the cylinder block water jacket 19, the cylinder head water jacket 20, and the exhaust port water jacket 21, and outputs a signal. The heater switch 38 is switched on and off by an operation of an occupant of the vehicle 10. The ignition switch 39 is switched on and off according to an operation of an occupant of the vehicle 10 or a situation of the vehicle 10. When the ignition switch 39 is turned on, the crankshaft of the engine 11 rotates and torque can be transmitted to the drive wheels of the vehicle 10. When the ignition switch 39 is turned off, the engine 11 is stopped.

The angle sensor 40 detects a rotation angle in the rotational direction of a valve body 57 connected to the rotating shaft 83 of the electric motor 16 via a gear (not shown), and outputs a signal. For the angle sensor 40, a magnetic sensor, for instance, can be used. A malfunction warning light 41 is provided in the interior of the vehicle 10 and can be viewed by an occupant of the vehicle 10. The malfunction warning light 41 turns on when the switching valve 13 is malfunctioning and turns off when the switching valve 13 is normal.

The switching valve 13 includes an input port 42 into which coolant flows, and three output ports 43, 44, 45 from which coolant flows out. The input port 42 splits in three directions and is connected to the output ports 43, 44, 45. The cooling passages 31, 33, 35 are connected in parallel to the input port 42.

A blower motor 46 is provided which is driven and stopped by the controller 18. The heater core 15 is provided in a passage of air transported by the blower motor 46. The heater core 15 is a heat exchanger for heating air for air conditioning, and the heater core 15 has a passage for coolant. An inlet 47 of the heater core 15 is connected to the output port 43 of the switching valve 13 via a cooling passage 48. An outlet 49 of the heater core 15 is connected to the suction port 22 of the water pump 12 via a cooling passage 50.

The radiator 14 is disposed in the front of an engine room of the vehicle 10. The radiator 14 exchanges heat between coolant and air to lower the temperature of the coolant. An inlet 51 of the radiator 14 is connected to a cooling passage 52, and an outlet 53 of the radiator 14 is connected to the suction port 22 of the water pump 12 via a cooling passage 54.

Figure 2:
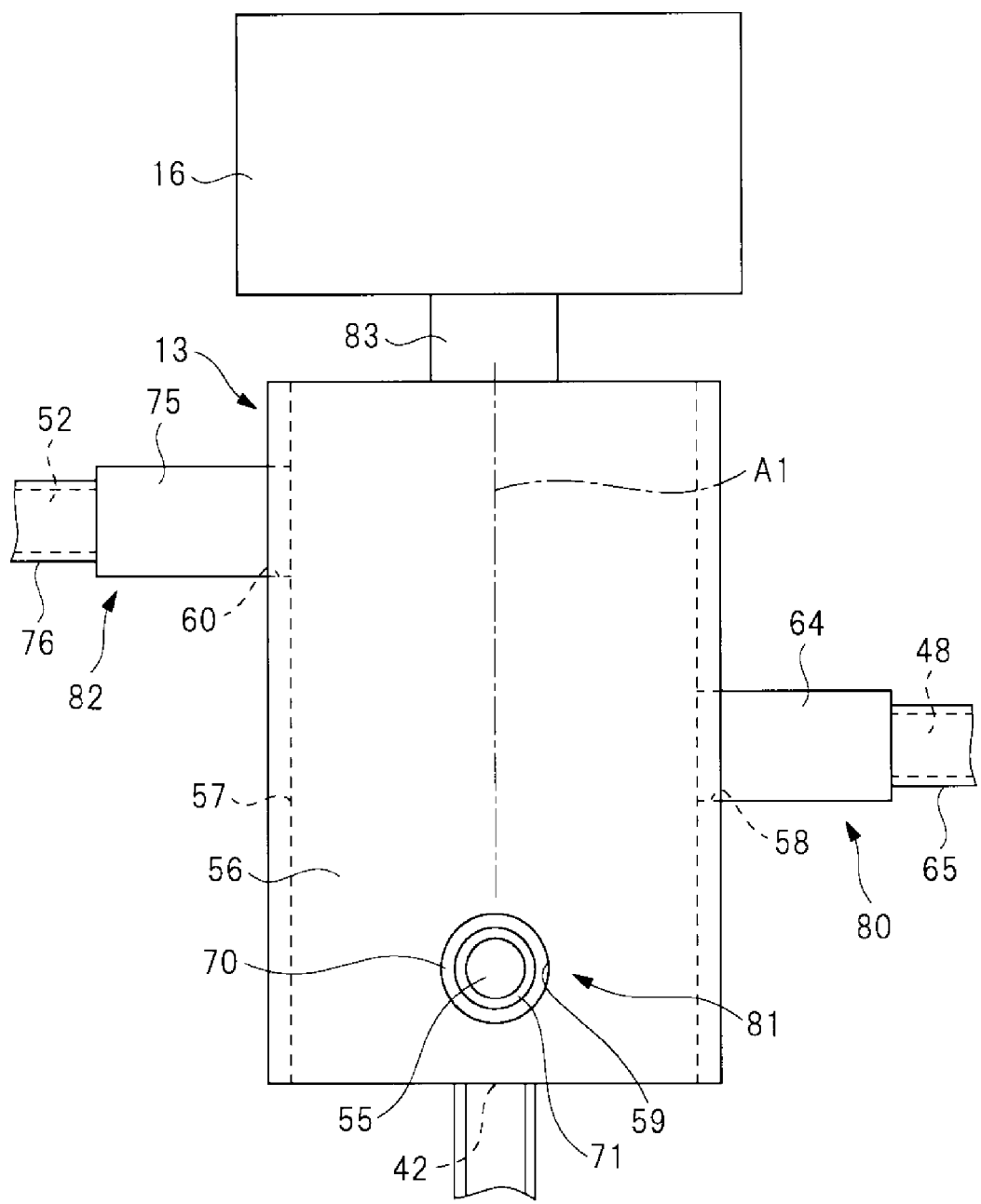
FIG. 2 is a side view illustrating a switching valve of the cooling control device.

Referring to FIGS. 2 and 3, a particular configuration of the switching valve 13 will be described. The switching valve 13 has a cylindrical housing 56 and the cylindrical valve body 57 provided in the housing 56. The housing 56 and the valve body 57 are made of metal or synthetic resin. The housing 56 is supported by brackets, frames, etc. of the engine room so that the housing 56 cannot rotate. The valve body 57 is connected to a rotating shaft 83 of the electric motor 16 via a gear (not shown). When the rotational force of the electric motor 16 is transmitted to the valve body 57, it is possible for the valve body 57 to rotate clockwise and counterclockwise about an axial line A1 in FIG. 3.

As illustrated in FIG. 3, mounting holes 58, 59, 60 are provided through the housing 56 in a radial direction. The mounting holes 58, 59, 60 are arranged at different positions in the circumferential direction of the housing 56. FIG. 3 illustrates an example in which the mounting holes 58, 59, 60 are arranged at intervals of 90 degrees from each other. As illustrated in FIG. 2, the mounting holes 58, 59, 60 are arranged at different positions in the axial line A1 direction of the housing 56. FIG. 2 illustrates an example in which the mounting hole 58 is disposed between the mounting hole 59 and the mounting hole 60.

Figure 4:
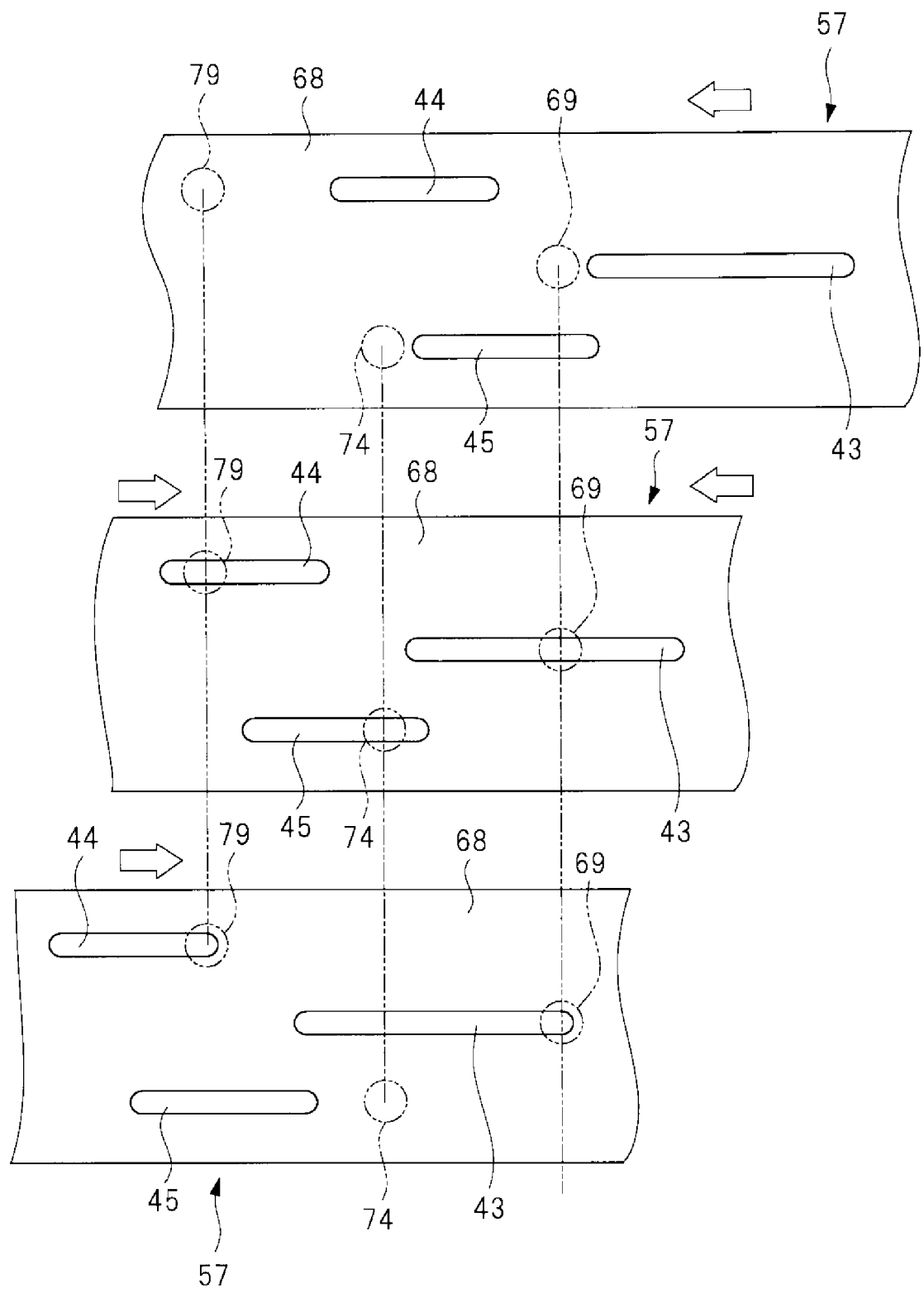
FIG. 4 is an exploded view illustrating the operation of a valve body of the switching valve.

As illustrated in FIG. 4, output ports 43, 44, 45 are provided on an outer peripheral surface 68 of the valve body 57. The output ports 43, 44, 45 are grooves provided over a predetermined range in the rotational direction of the valve body 57. The output ports 43, 44, 45 are disposed at different positions along the axial line A1 direction and different ranges in the rotational direction of the valve body 57. When the valve body 57 is viewed from the side, each of the output ports 43, 44, 45 is an elongated hole provided along the rotational direction of the valve body 57, that is, parallel to the rotational direction. The valve body 57 has passages connecting the input port 42 to each of the output ports 43, 44, 45.

As illustrated in FIG. 3, a connecting pipe 64 is inserted into the mounting hole 58 and is fixed to the housing 56. Further, a sealing member for sealing the space between the housing 56 and the connecting pipe 64 is provided. A transport pipe 65 is connected to the connecting pipe 64, and a cooling passage 48 is provided in the transport pipe 65. A sealing member 66 is disposed in the connecting pipe 64. The sealing member 66 is made of synthetic rubber and has a cylindrical shape. A spring 67 is disposed in the connecting pipe 64 and presses the sealing member 66 against the outer peripheral surface 68 of the valve body 57. The sealing member 66 has a port 69, and the port 69 is connected to the cooling passage 48.

In the axial line A1 direction of the valve body 57, the disposed range of the port 69 and the disposed range of the output port 43 illustrated in FIG. 4 at least partially overlap with each other. The inner diameter of the sealing member 66 is larger than the width of the output port 43 in the axial line A1 direction. As the valve body 57 rotates, the port 69 is connected or shut off from the output port 43.

As illustrated in FIG. 3, the sealing member 66 contacts the outer peripheral surface 68 of the valve body 57 to form a sealing surface. The sealing member 66 prevents coolant delivered from the input port 42 to the port 69 from leaking from between the sealing member 66 and the outer peripheral surface 68 of the valve body 57. The sealing member 66, the connecting pipe 64, and the transport pipe 65 constitute a coolant transporting unit 80.

A connecting pipe 70 is inserted into the mounting hole 59 and is fixed to the housing 56. Further, a sealing member for sealing the space between the housing 56 and the connecting pipe 70 is provided. A transport pipe 71 is connected to the connecting pipe 70, and a bypass passage 55 is provided in the transport pipe 71. The sealing member 72 is disposed in the connecting pipe 70. The sealing member 72 is made of synthetic rubber and has a cylindrical shape. A spring 73 is disposed in the connecting pipe 70 and presses the sealing member 72 against the outer peripheral surface 68 of the valve body 57. The sealing member 72 has a port 74, and the port 74 is connected to the bypass passage 55. In the axial line A1 direction, the disposed range of the port 74 and the disposed range of the output port 45 illustrated in FIG. 4 at least partially overlap with each other. The inner diameter of the sealing member 72 is larger than the width of the output port 45 in the axial line A1 direction. As the valve body 57 rotates, the port 74 is connected or shut off from the output port 45.

As illustrated in FIG. 3, the sealing member 72 contacts the outer peripheral surface 68 of the valve body 57 to form a sealing surface. The sealing member 72 prevents coolant delivered from the input port 42 to the port 74 from leaking from between the sealing member 72 and the outer peripheral surface 68 of the valve body 57. The sealing member 72, the connecting pipe 70, and the transport pipe 71 constitute a coolant transporting unit 81.

A connecting pipe 75 is inserted into the mounting hole 60 and is fixed to the housing 56. Further, a sealing member for sealing the space between the housing 56 and the connecting pipe 75 is provided. A transport pipe 76 is connected to the connecting pipe 75, and a cooling passage 52 is provided in the transport pipe 76. A sealing member 77 is disposed in the connecting pipe 75. The sealing member 77 is made of synthetic rubber and has a cylindrical shape. A spring 78 is disposed in the connecting tube 75 and presses the sealing member 77 against the outer peripheral surface 68 of the valve body 57. The sealing member 77 has a port 79, and the port 79 is connected to the cooling passage 52. In the axial line A1 direction, the disposed range of the port 79 and the disposed range of the output port 44 illustrated in FIG. 4 at least partially overlap with each other. The inner diameter of the sealing member 77 is larger than the width of the output port 44 in the axial line A1 direction. As the valve body 57 rotates, the port 79 is connected or shut off from the output port 44.

As illustrated in FIG. 3, the sealing member 77 contacts the outer peripheral surface 68 of the valve body 57 to form a sealing surface. The sealing member 77 prevents coolant delivered from the input port 42 to the port 79 from leaking from between the sealing member 77 and the outer peripheral surface 68 of the valve body 57. The sealing member 77, the connection pipe 75, and the transport pipe 76 constitute a coolant transporting unit 82.

The function of the vehicle 10 illustrated in FIG. 1 will be described. When the ignition switch 39 is turned on to rotate the crankshaft of the engine 11, the water pump 12 is driven by the rotational force of the crankshaft. The water pump 12 draws in the coolant from the suction port 22 and discharges the coolant from the discharge port 23. A part of the coolant discharged from the discharge port 23 passes through the cooling passage 24, the cylinder block water jacket 19, and the cooling passage 31, and is delivered to the input port 42 of the switching valve 13. A part of the coolant discharged from the discharge port 23 passes through the cooling passage 25, the cylinder head water jacket 20, and the cooling passage 33, and is delivered to the input port 42 of the switching valve 13. A part of the coolant discharged from the discharge port 23 passes through the cooling passage 26, the exhaust port water jacket 21, and the cooling passage 35, and is delivered to the input port 42 of the switching valve 13.

The controller 18 controls the operation, stopping, and stopping position of the valve body 57 of the switching valve 13 based on an input signal and information stored in a storage device. Specifically, the signal to be given to the motor drive circuit 17, a duty ratio of a PWM signal for instance, is controlled and the position of the valve body 57 of the switching valve 13 is changed and stopped between a first position and a third position. The controller 18 can process the signal of the angle sensor 40 to determine the rotational position of the valve body 57.

The controller 18 selects the first position when the warm-up conditions for the engine 11 are satisfied such that the ignition switch 39 is turned on to start the engine 11, the heater switch 38 is turned off, and the coolant temperature detected by the coolant temperature sensor 37 is equal to or less than a predetermined temperature. When the controller 18 stops the valve body 57 of the switching valve 13 at the first position illustrated in the upper part of FIG. 4, the port 69 and the output port 43 are shut off from each other, the port 74 and the output port 45 are shut off from each other, and the port 79 and the output port 44 are shut off from each other. That is, the coolant delivered to the switching valve 13 is not delivered to the radiator 14, the heater core 15, and the bypass passage 55.

Figure 5:
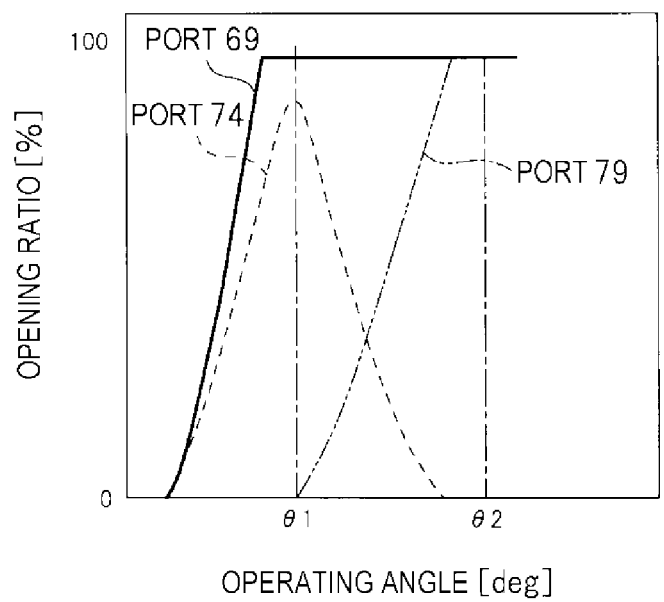
FIG. 5 is a chart illustrating an example of a relationship between operating angles of the valve body and opening ratios of ports.

FIG. 5 is a chart illustrating an example of a relationship between operating angles of the valve body 57 and opening ratios of the port 69, 74, 79. The opening ratio of the port 69 is a ratio of the area in which the port 69 is connected to the output port 43. The opening ratio of the port 74 is a ratio of the area in which the port 74 is connected to the output port 45. The opening ratio of the port 79 is a ratio of the area in which the port 79 is connected to the output port 44. The operating angle of 0 degrees corresponds to the first position of the valve body 57. When the operating angle of the valve body 57 is 0 degrees, the opening ratios of the ports 69, 74, 79 are all 0%.

When the controller 18 detects that the heater switch 38 is on, the controller 18 can control the switching valve 13 to operate the valve body 57 from the first position and stop at the second position. The valve body 57 operates in, for instance, a clockwise direction in FIG. 3. In this case, the valve body 57 moves to the left in FIG. 4, the port 69 connects with the output port 43, and the port 74 connects with the output port 45. The opening ratio of the port 69 and the opening ratio of the port 74 increase until the position of the valve body 57 reaches the operation angle $\theta 1$ after the valve body 57 starts operating from the first position. The operating angle $\theta 1$ corresponds to the second position of the valve body 57.

When the controller 18 processes the signal of the coolant temperature sensor 37 and determines that the condition for suppressing the temperature increase of the coolant is satisfied, the controller 18 can control the switching valve 13 to switch the position of the valve body 57 from the second position to the third position. The third position of the valve body 57 corresponds to the operating angle $\theta 2$ in FIG. 5. While the valve body 57 is operating from the second position to the third position, as illustrated in the middle of FIG. 4, the port 69 and the output port 43 are connected, the port 74 and the output port 45 are connected, and the port 79 and the output port 44 are connected. Further, the opening ratio of the port 74 decreases for angles greater than or equal to the operating angle $\theta 1$ of the valve body 57.

Further, before the valve body 57 position reaches the operating angle $\theta 2$ shown in FIG. 5, the port 74 and the output port 45 are shut off from each other, and when the position of the valve body 57 reaches the operating angle $\theta 2$, the port 69 is connected to the output port 43 and the port 79 is connected to the output port 44 as illustrated in the lower part of FIG. 4. That is, the ports 69, 79 are open together as shown in FIG. 5. It should be noted that when the controller 18 rotates the valve body 57 counterclockwise in FIG. 3, the valve body 57 moves from the first position, through the second position, and then to the third position. Further, the controller 18 may make the valve body 57 stop between the first position and the second position or make the valve body 57 stop between the second position and the third position.

In the present example, when the controller 18 controls the switching valve 13 to operate the stopped valve body 57, the controller 18 performs a control operation to suppress a rush current, namely, overcurrent, into the controller 18.

Figure 6:
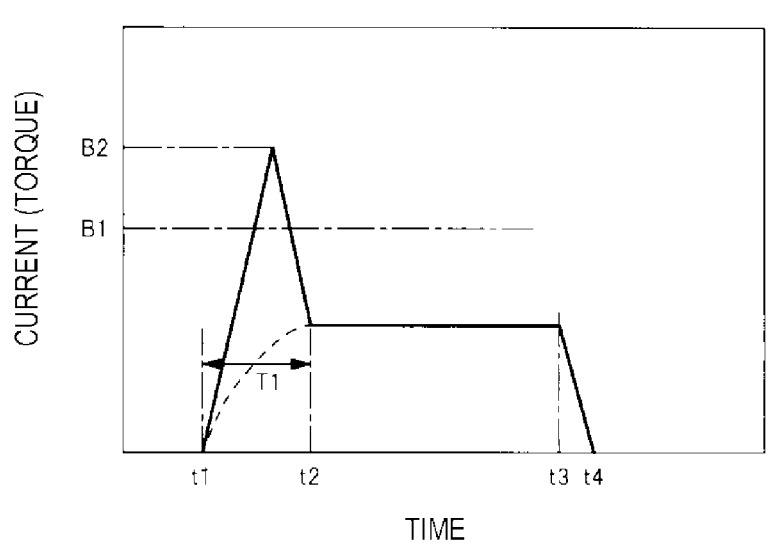
FIG. 6 is a timing chart illustrating an example of changes in current applied to an electric motor of the cooling control device.

FIG. 6 is a chart illustrating an example of current applied to the electric motor 16. In order to operate the valve body 57, a current is applied to the electric motor 16 from time t1. The controller 18 controls the current applied to the electric motor 16 to be smaller than an upper limit value B1 during a period from time t1 until the predetermined time T1 elapses at time t2. The upper limit value of the current applied to the electric motor 16 is controlled, for instance, in a manner indicated by the broken line. The upper limit value B1 is, for instance, 7.1 amperes. The duty ratio of the signal supplied from the controller 18 to the motor drive circuit 17 is controlled so that the current applied to the electric motor 16 becomes smaller than the upper limit value B1. In this way, it is possible to suppress the rush current to the controller 18 and protect the controller 18.

The predetermined time T1 corresponds to an elapsed time from the time when the valve body 57 starts operating to the time at which the operating speed of the valve body 57 becomes substantially constant. Therefore, the operation of the valve body 57 at the time of starting the operation is stabilized.

Furthermore, the duty ratio is limited within the predetermined time T1 which is not the entire range of time during which the switching valve 13 is operated. Consequently, it is possible to suppress the degradation of the operational responsiveness when the stopped valve body 57 starts to operate. Further, it is possible to suppress foreign matter from getting caught between the outer peripheral surface 68 of the valve body 57 and the sealing members 66, 72, 77.

Figure 7:
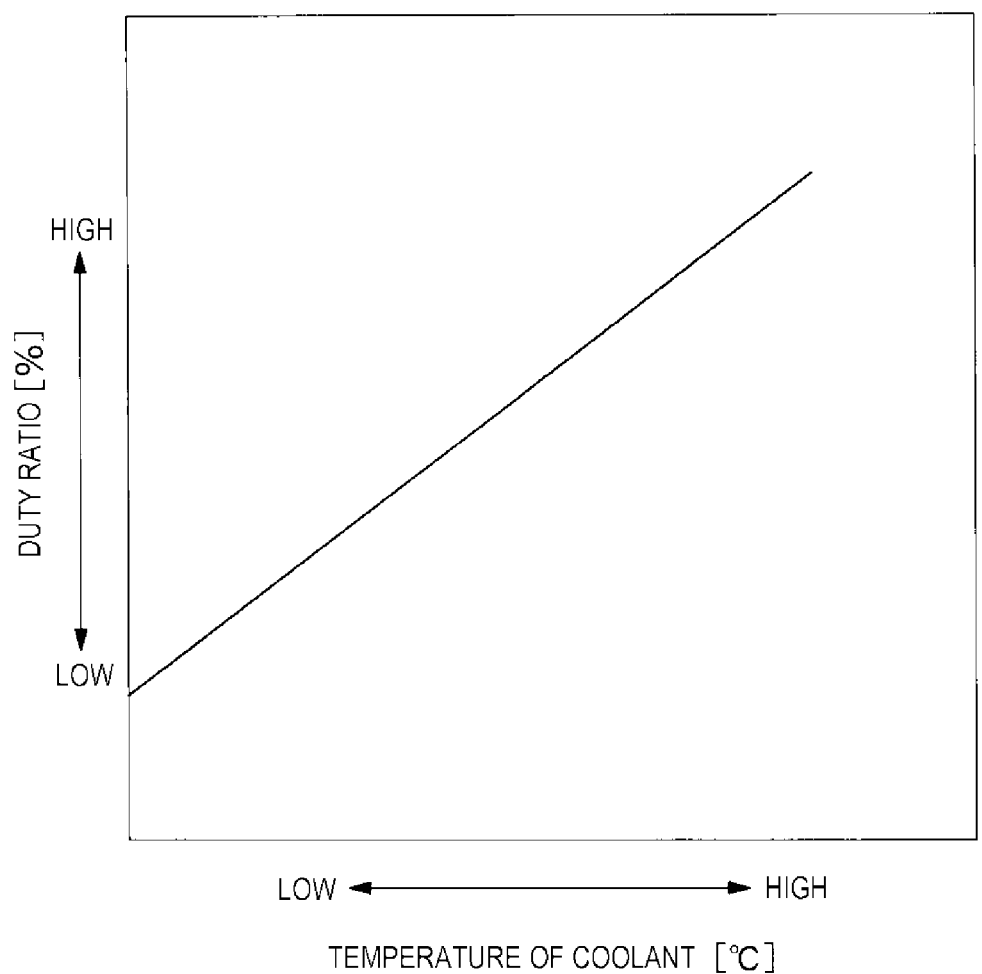
FIG. 7 is a chart illustrating a relationship between a duty ratio for controlling the switching valve and temperature of a coolant.

The controller 18 sets the upper limit value of the duty ratio of the signal supplied to the motor drive circuit 17 in accordance with the temperature of the coolant detected by the coolant temperature sensor 37. Specifically, as shown in FIG. 7, the duty ratio is set higher as the temperature of the cooling water increases.

Further, the controller 18 controls the duty ratio of the signal supplied to the motor drive circuit 17 for a predetermined period of time T1, thereby controlling the current applied to the electric motor 16. Therefore, it is not necessary to provide an element for detecting the current applied to the electric motor 16, for example, a current detection sensor, and an increase in the number of components can be suppressed.

The current applied to the electric motor 16 is substantially constant after time t2. When the controller 18 detects that the condition for stopping the electric motor 16 is satisfied at time t3, the controller 18 suppresses the current applied to the electric motor 16 to a minimum value at time t4.

In contrast, the current applied in a comparative example will be described with reference to FIG. 6. In this example, the current applied to the electric motor is not restricted when the electric motor is rotated. The current applied in the comparative example changes from time t1 to time t2, for example, as indicated by the solid line. The current applied to the electric motor becomes a predetermined value B2 that exceeds the upper limit value B1.

A control operation of the switching valve 13 will be described with reference to the flowchart of FIG. 8. In step S1, the controller 18 determines whether the switching valve 13 is stopped. If a Yes determination is made in step S1, the controller 18 proceeds to step S2 and detects whether the switching valve 13 started operating.

When a Yes determination is made in step S2, the controller 18 sets the "rush current determination flag=1" in step S3. In step S4, the controller 18 reads a conversion table of duty ratios for restricting the rush current. FIG. 7 illustrates an example of a chart that the conversion table relies on, and the conversion table is read in step S4.

The controller 18 performs the first procedure and the second procedure in step S5, and ends the control example of FIG. 8. The first procedure is to switch the upper limit value of the duty ratio to a duty ratio based on a chart for limiting the rush current when controlling the switching valve 13. The second procedure is to switch to the upper limit value of the original duty ratio after a predetermined time T1 from the time at which the rush current is generated.

When a No determination is made in step S2, the controller 18 repeats the determination of step S2. When a No determination is made in step S1, the controller 18 ends the control example of FIG. 8.

When the matters in the present example are described, the output ports 43, 44, 45 are examples of coolant outlets, the controller 18 is an example of a controller, and the input port 42 is an example of a coolant inlet. The cylinder block, the cylinder head, and the exhaust port are examples of a part of the engine 11 to be cooled.

The cooling control device and the switching valve are not limited to the above-described example, and can be changed in various ways without deviating from the gist thereof. The number of coolant outlets and the number of coolant transporting units provided in the switching valve can be arbitrarily changed. The operating position of the valve body 57 can be set such that coolant of the input port 42 can be delivered to only the bypass passage 55 but not to the cooling passages 48, 52. In addition, the operating position of the valve body 57 can be set such that coolant of the input port 42 is delivered only to the cooling passage 48 but not to the cooling passage 52 or the bypass passage 55. In addition, the operating position of the valve body 57 can be set such that coolant of the input port 42 is delivered to the cooling passage 52 and the bypass passage 55 and not to the cooling passage 48.

The plurality of coolant outlets may also be provided on an end surface perpendicular to the axial line, i.e., the rotational axis, of the valve body, in addition to the outer peripheral surface of the cylindrical valve body. In this case, each of the plurality of coolant outlets is disposed on different circumferences with the axial line, i.e., the rotational axis, of the valve body at the center. The plurality of coolant transporting units also contact an end surface perpendicular to the axial line, i.e., the rotational axis, of the valve body.

Further, the valve body may be rotatable around the axial line of the valve body, and may be a spherical valve body instead of a cylindrical valve body. Further, the valve body may have a shaft shape. The shaft-shaped valve body may be either a valve body that reciprocates in the longitudinal direction or a rotating valve body. The controller may be a standalone electric or electronic component, or may be a unit having a plurality of electric or electronic components. Electrical or electronic components include processors, control circuits, and modules.

According to the present invention, the operation of the switching valve can be controlled in a predetermined period of time, and the electric motor can be controlled without providing a current detector. Consequently, an increase in the number of components for controlling the electric motor can be suppressed.

The invention claimed is:

1. A cooling control device, comprising:
  a switching valve having a coolant outlet, the coolant outlet being configured such that a coolant flows through the coolant outlet;
  an electric motor configured to operate the switching valve to switch connecting and shutting off between the coolant outlet and a coolant transporting unit by supplying, to the electric motor, voltage and current according to a first duty ratio of an input signal; and
  a circuitry configured to switch, when making the electric motor be started to operate the switching valve stopped, the first duty ratio to a second duty ratio that limits a rush current input to the controller to at least a value less than the rush current until operating speed of the switching valve becomes constant, the second duty ratio depending on a temperature of the coolant.

2. A cooling control device comprising:
  a switching valve having a coolant outlet, the coolant outlet being configured such that a coolant flows through the coolant outlet;
  an electric motor configured to operate the switching valve to switch connecting and shutting off between the coolant outlet and a coolant transporting unit by supplying, to the electric motor, voltage and current according to a first duty ratio of an input signal; and
  a controller configured to switch, when making the electric motor be started to operate the switching valve stopped, the first duty ratio to a second duty ratio that limits a rush current input to the controller to at least a value less than the rush current until operating speed of the switching valve becomes constant, the second duty ratio depending on a temperature of the coolant, wherein
  the controller is configured to switch the second duty ratio to the first duty ratio when the operating speed of the switching valve becomes constant.

3. The cooling control device according to claim 2, wherein
  the switching valve has a coolant inlet for transporting the coolant to the coolant outlet, and
  the coolant inlet is connected to a part of an engine, the part being to be cooled.

4. The cooling control device according to claim 3, wherein
  the switching valve has a valve body configured to be rotated by the electric motor, and
  when the valve body rotates, connecting and shutting off between the coolant outlet and the coolant transporting unit are switched.

5. The cooling control device according to claim 2, wherein
  the switching valve has a coolant inlet for transporting the coolant to the coolant outlet, and
  the coolant inlet is connected to a part of an engine, the part being to be cooled.

6. The cooling control device according to claim 5, wherein
  the switching valve has a valve body configured to be rotated by the electric motor, and
  when the valve body rotates, connecting and shutting off between the coolant outlet and the coolant transporting unit are switched.

7. The cooling control device according to claim 2, wherein
  the switching valve has a valve body configured to be rotated by the electric motor, and
  when the valve body rotates, connecting and shutting off between the coolant outlet and the coolant transporting unit are switched.

8. The cooling control device according to claim 2, wherein
  the switching valve has a valve body configured to be rotated by the electric motor, and
  when the valve body rotates, connecting and shutting off between the coolant outlet and the coolant transporting unit are switched.

9. The cooling control device according to claim 2, wherein
  the second duty ratio is configured to increase in proportion to the temperature of the coolant.

* * * * *